March 24, 1959 J. O. PREISIG 2,879,390
PHASE CONTROLLED OSCILLATOR
Original Filed July 28, 1953
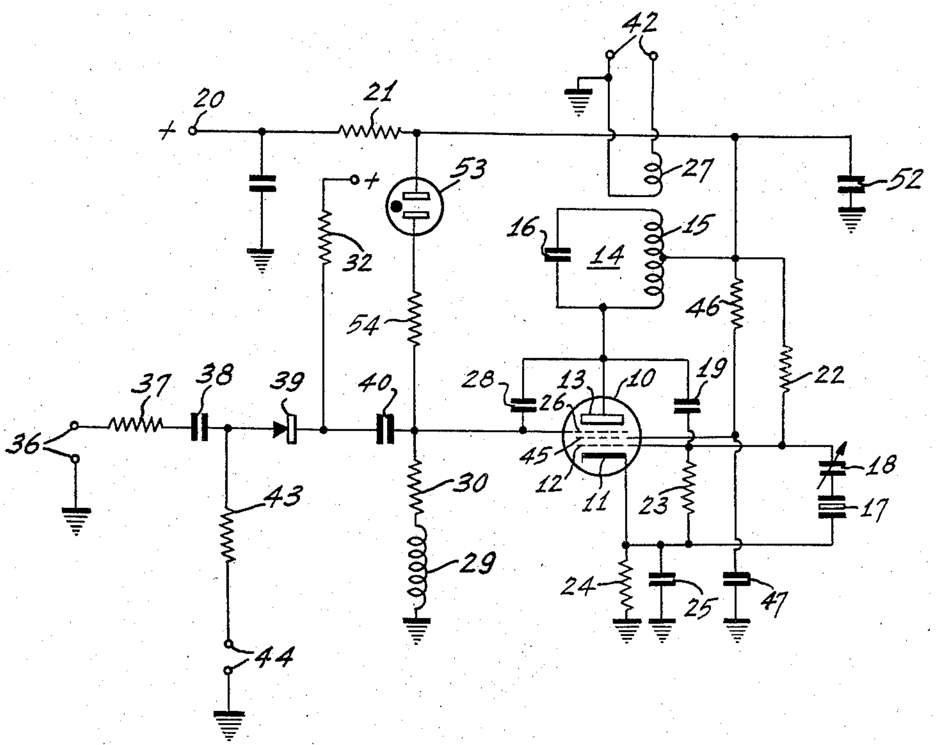
INVENTOR.
JOSEPH O. PREISIG
BY
[signature]
ATTORNEY 2,879,390

PHASE CONTROLLED OSCILLATOR

Joseph O. Preisig, Trenton, N.J., assignor to Radio Corporation of America, a corporation of Delaware Continuation of application Serial No. 370,742, July 28, 1953. This application November 9, 1956, Serial No. 621,286

12 Claims. (Cl. 250—36)

This invention relates generally to controlled oscillator circuits, and particularly to oscillator circuits capable of providing synchronous operation with a reference wave in television receivers and the like.

This application is a continuation of my copending application, Serial No. 370,742, filed July 28, 1953, bearing the title, Phase Controlled Oscillator.

In a type of color television system presently proposed for use commercially, the sidebands of a subcarrier wave, which is both phase and amplitude modulated in accordance with the color information of a subject, are interspersed with the video signals representing brightness of the subject. By properly choosing the frequency of the color subcarrier wave, the color signal modulated sideband energy components is made to fall between the brightness signal energy components.

In such a system the color information is derived at a receiver by synchronously demodulating the color subcarrier wave. Such demodulation is effected under the control of a reference frequency oscillator operating in synchronism and in definite phase relation with the received phase and amplitude modulated color subcarrier wave.

For the synchronization of the reference frequency oscillator in a circuit remote from a broadcast transmitter, it is the present practice to transmit a composite signal which includes not only the video signals comprising the brightness and color information, and the usual horizontal and vertical synchronizing signals, but also bursts of several cycles each of the color subcarrier wave frequency respectively during time intervals following the horizontal synchronizing signals. Such a color synchronizing system is described in a publication titled Recent Developments in Color Synchronization in the RCA Color Television System issued by the Radio Corporation of America, February 1950. Such a system is also described in U.S. Patent 2,594,380 issued April 29, 1952, to L. F. Barton and P. H. Werenfels entitled Synchronizing Apparatus for Color Signal Sampling Oscillators.

The demodulation of the color subcarrier wave and its sidebands, as previously mentioned, is performed along definite axes or phases. Since the accuracy of these phases will determine the accuracy of the hue of the color information ultimately applied to the kinescope, there must be information transmitted with the composite signal which establishes a reference phase. This color synchronizing information referred to as the burst must be extracted from the composite signal and used to establish a pair of continuous wave signals of phase corresponding to the I and Q axes. These continuous wave signals are used in a pair of synchronous detector circuits whose outputs are the I and Q signals in the present type of color television receiver. These continuous wave signals may be obtained in a number of different ways.

One method is to use a crystal oscillator whose exact frequency is determined by a reactance tube which is in turn controlled by an error signal proportional to the difference in phase between the incoming synchronization information and the oscillator output.

Another method of obtaining these continuous wave signals is described and claimed in a copending application of George C. Sziklai, Serial No. 361,894, filed June 16, 1953, now Patent No. 2,853,546, entitled Phase Controlled Oscillators. There is therein disclosed a color hold circuit utilizing a single amplifier device such as a transistor or a vacuum tube arranged in a circuit to provide the three separate functions of phase detection, oscillation generation, and reactance control of the oscillator circuit. Accordingly, the amplifier device is arranged to provide self-sustained oscillation and the input information, which may constitute bursts of the subcarrier color wave, is applied to a portion of the oscillator circuit and compared in phase with the generated wave to produce a direct current control voltage or error signal, which is proportional to the sine of the phase angle between the burst information and the generated wave. This direct current control voltage is, in turn, utilized to vary the phase of the generated wave so that the generated wave is made to be cophasal with the burst information and is locked in phase with the burst information during the discrete intervals which lie between the received bursts.

An object of the present invention, therefore, is to provide an improved automatic frequency control system for color television receivers to effect simpler and more efficient synchronization of a color subcarrier reference frequency oscillator in response to receive bursts of the color subcarrier wave.

Another object of the present invention is to provide an improved oscillator circuit which may effectively be locked in phase by information received in the form of a discrete burst of information and which effectively remains locked in phase until receipt of the next burst of information.

A further object of the present invention is to provide an improved reference frequency oscillator which is insensitive to amplitude variation and which, therefore, requires no separate limiting action.

It is another object of the present invention to provide an automatic frequency control system for television receivers and the like which may operate with a single amplifier device functioning simultaneously as an oscillator, a phase detector and a reactance tube device.

In accordance with the present invention, an amplifier device such as an electron discharge device having two control electrodes is utilized as a reference frequency oscillator and arranged in a crystal controlled oscillator circuit. Bursts of the color subcarrier wave which have been separated from the composite video signal by gating at an appropriate time when the burst information is available, are impressed upon a second one of the control electrodes thereby developing in the anode circuit a control voltage or error signal which is proportional to the sine of the phase angle between the bursts of the color subcarrier wave and the wave generated by the oscillator circuit.

The error signal which has thus been developed is applied to a first one of the control electrodes of the electron discharge device to adjust the phase of the reference frequency oscillator circuit in accordance with the information contained in the burst, so that the signal generated in the reference frequency oscillator circuit is cophasal with the burst information. The time constant of the circuit wherein the error signal is developed is sufficiently long to maintain the effect of the error signal so that the reference frequency oscillator remains locked in for the time duration existing between the bursts of the color subcarrier wave.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

The single figure is a schematic circuit diagram of a controlled oscillator circuit in accordance with the present invention.

In television systems of a type in which this invention may be incorporated, video information is transmitted during recurring intervals and scanning control signals, as well as blanking signals, are transmitted in between these intervals. A horizontal sync pulse is superimposed upon a blanking pulse and that portion of the blanking pulse following the superimposed horizontal sync pulse is generally termed the "back porch."

In accordance with present standards, a sampling control signal of a properly selected frequency comprising a color synchronizing burst, such as a burst of a color subcarrier wave, is transmitted during this back porch interval. That is to say it follows a sync signal but occurs during blanking. At the receiver the sampling control signal occurring during the back porch interval is used to control the phase and frequency of the reference frequency oscillator. In this way, extremely stable synchronization can be obtained between the sampling at the receiver and the sampling at the transmitter in such manner as to not interfere with the normal operation of the television receiver.

Referring now to the single figure, an electron discharge device 10, which preferably is a mixer type device of the 6AS6 variety having two control grids thereby providing for the multiplication of two signals, is arranged in a circuit to provide the function of oscillation generation, phase detection, and reactance control. Accordingly, a cathode 11, a first control grid 12, and an anode 13 are connected to provide a crystal controlled oscillator circuit. It is to be understood that the oscillator circuit utilized in this arrangement can be other than the crystal controlled circuit illustrated. However, the oscillator circuit should be selected in a way that the phase controlling action of the reactance control section is best.

The crystal controlled oscillator circuit comprises a parallel resonant tuned circuit 14 connected to the anode 13 and including a tapped inductor 15 and a capacitor 16. It is to be noted that the parallel resonant tuned circuit 14 is tuned to the desired operating frequency of the oscillator circuit which in the example above discussed, is the frequency of the color subcarrier wave and is identical with the frequency controlling wave, which in the example above discussed, constitutes bursts of the color subcarrier wave. Further the inductor 15 is coupled with an output circuit comprising an output inductor 27 which is provided with a pair of output terminals 42.

A frequency stabilizing element illustrated as a piezoelectric crystal 17 is connected in series with a trimmer capacitor 18 between the control grid 12 and the cathode 11, and the feedback necessary to sustain oscillation is provided by a feedback capacitor 19 which is connected between the anode 13 and the control grid 12.

Energizing potentials may be provided from any convenient source of direct current potential having its positive terminal connected to the terminal 20 and its negative terminal connected to a point of fixed reference potential such as ground.

As will be discussed more fully hereinafter, an error signal is developed across a direct current load impedance element illustrated as a resistor 21, which is connected between the terminal 20 and the tap on the inductor 15.

In order to provide the necessary operating potentials for the various electrodes of the electron discharge device 10, the first control grid 12 and the cathode 11 are connected to a voltage divider network comprising three resistors 22, 23, and 24 which are connected in series arrangement between the junction of the direct current load impedance element 21 and the tap on the inductor 15 and ground. The voltage divider resistor 24 which also constitutes a cathode resistor for the electron discharge device 10 may be bypassed at signal frequencies by a capacitor 25. It is also to be noted that the voltage divider resistor also constitutes a feedback circuit for applying a portion of the error signal directly to the control grid 12.

It is readily seen upon examination that the portion of the circuit just described comprises a crystal controlled oscillator circuit which oscillates at a frequency determined by the parallel resonant circuit 14 and the frequency stabilizing element 17. It is noted that in normal operation such a circuit is considered to be very stable as to frequency shift which might otherwise be caused by changes in circuit elements.

The cathode 11, a second control grid 26, and the anode 13 further constitute in combination with other circuit elements an arrangement commonly referred to as a reactance tube circuit. Accordingly, a capacitor 28 is connected between the anode 13 and the second control grid 26, and an impedance element illustrated as an inductor 29 is connected in series with a resistor 30 between the control grid 26 and ground. The values of the capacitor 28 and the inductor 29 are chosen to provide a 90-degree phase shift between the voltage appearing at the anode 13 and the voltage appearing at the control grid 26. It is, of course, to be understood that the other available circuit elements for obtaining the 90-degree phase shift may be employed. The illustrated type of 90-degree feedback phase shift arrangement which provides the best operation of the electron discharge device system as a reactance tube is chosen to provide the phase control of the oscillator.

It was above mentioned that the type of electron discharge device utilized in accordance with the present invention provides for the multiplication of two signals when a first signal is applied to the first control and a second signal is applied to the second control grid. It may now be readily seen that if the burst information is separated from the composite video signal and applied to the second control grid 26, that we will have the aforementioned condition prevailing in the circuit as the signal which is generated by the oscillator circuit will be present at the control grid 12. Accordingly, the burst information may be applied to a first pair of input terminals 36 and may be ultimately applied to the second control grid 26 through an RC network comprising a first resistor 37 and a capacitor 38 serially connected between the cathode of a unidirectional conducting device illustrated as a diode 39 and one of the first pair of input terminals 36. The cathode of the diode 39 is connected to the second control grid 26 through a coupling capacitor 40. Gating signals for gating the diode 39 at an appropriate time may be applied through a second input circuit comprising a resistor 43 connected in series between the anode of the diode 39 and one of a second pair of input terminals 44. The other of the second pair of input terminals 44 and the other of the first pair of input terminals 36 may be connected to ground. A bias resistor 32 is connected between the cathode of the diode 39 and a suitable source of bias potential in order to provide a static direct current bias for the diode 39 and thereby establish the gating conditions. It is, of course, to be understood that the polarity of the diode 39 and its associated bias supply depend upon the polarity of the gating pulses to be utilized. The value of the bias resistor 32 and the bias supply is chosen to maintain the diode 39 non-conductive during the video portion of the signal. However, during the blanking interval a higher level of signal will be present to override the static bias and provide a conductive condition for the diode 39.

In order to complete the circuit and provide energizing potentials for the screen grid 45, a voltage dropping resistor 46 is connected between it and the junction of the direct current load impedance element 21 and the feedback resistor 22. In order to maintain the screen grid 45 at signal ground potential, a by-pass capacitor 47 may be connected from the screen grid 45 to ground. A portion of the error signal will accordingly be applied to the screen grid 45 through the voltage dropping resistor 46. If it is desired to avoid this additional feedback, the voltage dropping resistor may be connected directly to the terminal 20. Accordingly, either connection may be utilized depending on the results desired.

Let it now be assumed that the oscillator circuit as above described is oscillating and accordingly that a signal voltage generated by the oscillator circuit is present at the first control grid 12. Further, let it be assumed that by an apropriate gating signal a burst of color subcarrier wave is applied to the second control grid 26 through the diode 39.

Under these conditions, the resulting change in the current flowing in the anode 13 is proportional to the product of the voltages appearing at the first control grid 12 and at the second control grid 26. This variation of the current in the anode 13 will also provide a current variation in the direct current impedance element 21 connected in the anode circuit. Accordingly, a direct current voltage drop will appear across the direct current impedance element 21 and further, there will be a variation in this voltage drop which is proportional to the product of the signals appearing at the first control grid 12, and at the second control grid 26.

This change in the voltage at the anode electrode 13 is utilized in accordance with the present invention as an error signal to control the reactance portion of the circuit.

It may be readily shown that the change in anode current is directly proportional to the phase difference of the two signals, and since the change in the voltage at the anode 13 is equal to the product of the impedance of the direct current impedance element 21 and the change in the anode current, there is obtained an error signal which is proportional to the sine of the phase angle between the two applied signals.

In order to provide an error signal in accordance with the present invention, which will maintain the oscillator in a locked-in condition between the application of the discrete bursts of the subcarrier color wave, a capacitor 52 is connected between ground and the junction of the direct current load impedance element 21 and the tap on the inductor 15. The value of the capacitor 52 is chosen to provide in combination with the direct current load impedance element 21 a time constant which is sufficiently long to maintain the error signal during the time interval between the bursts of subcarrier wave energy which is normally in the order of 60 microseconds.

The error signal thus developed is applied to the second control grid 26 by means of a gaseous discharge device 53 and an isolating element illustrated as resistor 54 which are connected in series between the direct current load impedance element 21 and the second control grid 26. A gaseous discharge device such as a neon tube is utilized to apply the error signal to the second control grid 26 as it is well known that a gaseous discharge device of this type maintains substantially constant direct current voltage drop thereacross and accordingly the variations in direct current voltage represented by the error signal are applied to the second control grid 26. The isolating element 54 may also be a choke coil or other device offering a high impedance to the burst information and is necessary to prevent the burst information from being grounded through the anode circuit.

Accordingly, with this arrangement very efficient coupling is maintained between the direct current load impedance element 21 and the second control grid 26. The error signal, therefore, efficiently controls the amplification of the amplifier portion of the system comprising the anode 13, the cathode 11, and the second control grid 26 which always exists for the frequency for which the anode circuit or the parallel resonant circuit 14 is tuned. By controlling the amplification of this portion of the system, control of the reactance of the circuit is maintained.

The error signal or a fraction thereof may in addition also be applied to the screen grid 45 and to the first control grid 12 to support the frequency or phase controlling action of the remainder of the circuit.

The selection of the specific oscillator circuit to be utilized, the reactance device circuitry and the additional feedback arrangements, such as the feedback resistors 22 and 46, to the other electrodes is accordingly chosen in a way to support and amplify the phase control obtained through the development and application of the discriminator control voltage or error signal which is developed across the direct current load impedance element 21.

It is, therefore, readily seen that the controlled oscillator circuit provided in accordance with the present invention provides the three separate functions that are required for color synchronization in a color television receiving system. It is further readily seen that such a controlled oscillator circuit be utilized in other systems which require the synchronization of a local oscillator by a given control signal of the same frequency. That is, the single circuit requiring but a single electron discharge device provides the function of a phase detector, a variable reactance device and a reference frequency oscillator with but a minimum of circuit elements. It has been found that this type circuit locks in effectively in phase with burst information and remains locked in until varied by an additional burst of information, and further the circuits are substantially insensitive to amplitude variations.

It is accordingly apparent that the circuit may be also used in place of a limiter in television receiving systems or frequency modulation receiving systems and further may be used as a muting device in synchronized transmission systems or as a local carrier source in suppressed carrier transmission systems.

Having described the invention, what is claimed is:

1. A frequency and phase-controlled oscillator circuit comprising in combination: a single-ended amplifying electron flow device having an electron flow path, means including a tuned circuit coupled to said electron flow device to control the intensity of electron flow at a first point in said electron flow path for establishing an oscillatory circuit thereby to generate in said tuned circuit oscillations having a nominal frequency and to develop first modulations of said electron flow representative of said oscillations, circuit means coupled to said amplifying electron flow device at a second point different from said first point in said electron flow path for controlling the frequency and phase of said oscillations in response to a control potential applied thereto, means for introducing into said electron flow path second modulations representative of a reference signal having a reference frequency and phase such that said first and second modulations interact to produce in said electron flow a component of flow which is proportional to the phase and frequency difference between said oscillations and said reference signal, said circuit means being responsive to said flow component to develop at said second point in said electron flow path a control potential which is a function of said flow component, thereby to control the frequency and phase of said oscillations.

2. A frequency and phase-controlled oscillator circuit comprising in combination: a single-ended amplifier device having a plurality of electrodes including first and second control electrodes, circuit means connected to said first control electrode for establishing an oscillatory circuit thereby to generate a first wave having a nominal frequency, said second control electrode being capable of controlling the frequency and phase of said oscillation in response to a control voltage applied thereto, means to impress a reference second wave having a reference frequency and phase to said second control electrode of said amplifier device such that said first and second waves interact to cause a current to flow through said amplifier device which is proportional to the frequency and phase difference between said waves, means for developing from said frequency- and phase-difference proportional current flowing through said amplifier device a control voltage proportional to said frequency and phase difference, and means to apply said control voltage to said second electrode to control the frequency and phase of said generated wave in accordance with a frequency and phase prescribed by said impressed wave.

3. A controlled oscillator circuit comprising in combination: a single-ended amplifier device having a plurality of electrodes including first and second control electrodes, circuit means including a tank circuit connected with said first control electrode for establishing an oscillatory circuit thereby to generate a wave having a nominal frequency, apparatus operatively connected in circuit with said amplifier device and coupled to said second control electrode to render said second control electrode capable of controlling said frequency in response to an applied voltage, means to apply to one of said plurality of electrodes a reference wave having a reference frequency substantially equal to said nominal frequency in such manner as to develop a current through said amplifier device which is indicative of the phase difference between said waves, means responsive to said current to develop and to apply to said second control electrode a corrective voltage proportional to said phase difference, thereby to adjust the frequency of said generated wave to the reference frequency of said reference wave.

4. A frequency controlled oscillator circuit comprising in combination: a single amplifier device including first and second control electrodes and an anode, circuit means operatively connected to said single amplifier device and including a tank circuit connected with said first electrode for establishing an oscillatory circuit thereby to generate an oscillation having a nominal frequency, apparatus operatively connected to said amplifier device and coupled to said second control electrode to render said second control electrode capable of controlling the frequency of said oscillation responsive to a control voltage applied thereto, means to apply a reference frequency signal to said amplifier device to produce at said anode of said amplifier device a current resulting from the interaction of said oscillation and said reference frequency signal which is proportional to the phase difference between said oscillation and said reference frequency signal, means coupled to said anode and responsive to said current for developing a control voltage which is also proportional to said phase difference, means for applying said control voltage to said second control electrode to control the frequency of said oscillation in accordance with the frequency of said reference frequency signal.

5. A frequency and phase-controlled oscillator circuit comprising in combination: a single-ended amplifier device having a plurality of electrodes including first and second control electrodes, circuit means coupled to said amplifier device and including a tank circuit connected with said first control electrode for establishing an oscillating circuit thereby to generate a wave having a frequency, said first control electrode being capable of controlling the frequency of said oscillations responsive to a control voltage applied thereto, apparatus operatively coupled to said second control electrode to render said second control electrode capable of controlling said frequency in response to a control voltage applied thereto, means to apply to one of said plurality of electrodes a reference wave having a reference phase and a frequency substantially equal to said nominal frequency to develop a current through said amplifier device which is proportional to the phase and frequency difference between said generated wave and said reference wave, means responsive to said current to develop a control voltage which is proportional to said phase and frequency difference, and means to apply said control voltage to said first and second control electrodes to control the frequency and phase of said generated wave in accordance with the frequency and phase of said reference wave.

6. A controlled oscillator circuit comprising in combination, an amplifier device including a first and a second control electrode, a cathode and an anode, a parallel resonant oscillatory circuit coupled with said anode and a frequency stabilizing crystal element connected with said first control electrode for providing a generated signal wave, an input circuit for impressing a reference signal wave between said second control electrode and said cathode, means providing a direct-current operating voltage for said device including a direct-current load impedance element connected to said anode electrode, a storage capacitor connected in shunt with said load impedance element, a direct current conductive feedback element connected between said anode electrode and said second control electrode, and an output circuit for said generated wave coupled with said tank circuit.

7. A controlled oscillator circuit comprising in combination, an amplifier device including a first and a second control grid, a cathode and an anode, a parallel resonant oscillatory circuit connected with said anode and a frequency stabilizing crystal element connected with said first control grid for providing a generated signal wave, an input circuit for impressing at discrete intervals a reference signal wave between said second control grid and said cathode, means providing a direct-current operating voltage for said device including a voltage dropping resistor connected to said anode, a storage capacitor connected in shunt with said resistor, said resistor and said capacitor having a time constant in the order of said discrete intervals, a direct current conductive feedback element connected between said anode electrode and said second control electrode, and an output circuit for said generated wave coupled with said tank circuit.

8. A controlled oscillator system comprising in combination: an amplifier device including a first and a second control grid, a cathode and an anode, a parallel resonant oscillatory circuit connected with said anode and a frequency stabilizing crystal element connected with said first control grid for providing a generated signal wave, an input circuit for impressing a reference signal wave between said second control grid and said cathode, means providing a direct-current operating voltage for said device including a voltage dropping resistor connected to said anode, a storage capacitor connected in shunt with said resistor, said resistor and said capacitor having a time constant in the order of 60 microseconds, a direct current conductive feedback element connected between said anode electrode and said second control electrode, and an output circuit for said generated wave coupled with said tank circuit.

9. A controlled oscillator system comprising in combination: an amplifier device including a first and a second control grid, a cathode and an anode, and providing a reactive characteristic in said system; means including a parallel resonant tank circuit coupled between said cathode and said anode, and a frequency stabilizing crystal element connected between said first control grid and said cathode for establishing an oscillatory circuit thereby to generate a wave of a predetermined frequency; means coupled with said second control grid and said cathode for impressing a reference wave therebetween; means including said device and a load resistor connected with said anode for detecting the phase difference between the generated wave and said reference wave and providing an error signal in accordance therewith; direct current conductive means including a gaseous discharge device connected between said anode and said second control grid for impressing said error signal on said second control grid to vary said reactive characteristic in accordance with said phase difference and alter the frequency of oscillation of said oscillator circuit in accordance with the reactive change thereby to lock said oscillator circuit in phase with said reference wave.

10. A controlled oscillator system comprising in combination: an amplifier device including a first and a second control grid, a cathode and an anode, and having a reactive characteristic; means including a parallel resonant tank circuit connected between said anode and said cathode, and a frequency stabilizing crystal element connected between said first control grid and said cathode for establishing an oscillatory circuit to generate a wave of a predetermined frequency; means coupled with said second control grid for impressing a reference wave thereon; means including said device and a load resistor connected with said anode for detecting the phase difference between the generated wave and said reference wave and providing an error signal in accordance therewith; direct current conductive means including a gaseous discharge device and an isolating resistor connected in series between said load resistor and said second control grid for impressing said error signal on said second control grid to vary said reactive characteristic in accordance with said phase difference and the frequency of oscillation of said oscillator circuit in accordance with the reactive change, thereby to lock said oscillator circuit in phase with said reference wave.

11. A controlled oscillator circuit comprising in combination, an amplifier device including a first and a second control grid, a cathode and an anode, means including a parallel resonant tank circuit coupled with said anode electrode and a frequency stabilizing crystal element coupled between said first control grid and said cathode for establishing an oscillatory circuit to generate a wave having a predetermined frequency, input circuit means adapted to impress a reference wave between said second control grid and said cathode, means including a direct current load impedance element coupled with said anode for detecting the phase angle between said waves and providing an error voltage across said load impedance element, means including a gaseous discharge device and a current limiting resistor connected in series arrangement between said anode and said second control grid for impressing between said second control electrode and said common electrode said error voltage to alter the phase of said generated wave, means including a feedback resistor coupled between said parallel resonant tank circuit and said first control grid to further alter the frequency of said generated wave to be cophasal with said impressed wave, and an output circuit for the generated and controlled wave coupled with said control electrode.

12. A controlled oscillator circuit comprising in combination: an amplifier device including a first and a second control grid, a cathode and an anode and having a reactive characteristic in said circuit, means including a parallel resonant tank circuit coupled with said anode electrode and a frequency stabilizing crystal element coupled between said first control electrode and said common electrode for establishing an oscillatory circuit to generate a wave having a predetermined frequency, input circuit means adapted to impress a reference wave between said second control grid and said cathode, means including a load resistor coupled with said anode for detecting the phase difference between said waves, means including a gaseous discharge device and a current limiting resistor connected in series arrangement between said anode and said second control grid for impressing between said second control grid and said cathode an error signal proportional to said detected phase difference, means connected with said anode, said second control grid, and said cathode for providing a 90° phase shift between said anode and said second control grid whereby the reactance of said amplifier device is altered in accordance with said error signal to alter the frequency of said generated wave to be cophasal with said impressed wave, and an output circuit for the generated and controlled wave coupled with said control electrode.

References Cited in the file of this patent

UNITED STATES PATENTS

| | | |
|---|---|---|
| 2,538,261 | Moore | Jan. 16, 1951 |
| 2,624,005 | Hansen | Dec. 30, 1952 |
| 2,736,803 | Hugenholtz | Feb. 28, 1956 |